US012234808B2

(12) United States Patent
McGrath et al.

(10) Patent No.: US 12,234,808 B2
(45) Date of Patent: Feb. 25, 2025

(54) SYSTEM AND METHOD FOR SCHEDULING PREVENTATIVE MAINTENANCE ACTIONS BASED ON OPERATIONAL USAGE

(71) Applicant: General Electric Company, Schenectady, NY (US)

(72) Inventors: Edward Lee McGrath, Greer, SC (US); Brian J. Theilemann, Ballston Lake, NY (US); Michael James Rizzo, Glenville, SC (US); Robert Randall Waara, Simpsonville, SC (US); Brian Scott Geist, Ballston Spa, NY (US); Kyle Edward Thompson, Rotterdam, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 294 days.

(21) Appl. No.: 17/767,166

(22) PCT Filed: Oct. 11, 2019

(86) PCT No.: PCT/US2019/055875
§ 371 (c)(1),
(2) Date: Apr. 7, 2022

(87) PCT Pub. No.: WO2021/071515
PCT Pub. Date: Apr. 15, 2021

(65) Prior Publication Data
US 2022/0364549 A1 Nov. 17, 2022

(51) Int. Cl.
*F03D 80/50* (2016.01)
*F03D 9/25* (2016.01)
(Continued)

(52) U.S. Cl.
CPC ............. *F03D 80/50* (2016.05); *F03D 9/257* (2017.02); *G01M 13/00* (2013.01); *G05B 23/0283* (2013.01); *G06Q 10/20* (2013.01)

(58) Field of Classification Search
CPC ........ F03D 7/0292; F03D 80/50; F03D 7/046; F03D 9/257; F03D 7/0264; F03D 7/047;
(Continued)

(56) References Cited

U.S. PATENT DOCUMENTS 2,837,984 A 6/1958 Klotz
6,922,640 B2 7/2005 Vezzu et al.
(Continued)

FOREIGN PATENT DOCUMENTS

CN 101218401 A 7/2008
CN 102792240 A 11/2012
(Continued)

OTHER PUBLICATIONS

PCT International Search Report & Opinion PCTUS2019055875 Jun. 15, 2020.
CN Office Action with Translation, Oct. 26, 2024.

*Primary Examiner* — An H Do
(74) *Attorney, Agent, or Firm* — Dority & Manning, P.A.

(57) ABSTRACT

A method for operating and maintaining a wind farm comprising a plurality of wind turbines includes determining an odometer for one or more components of at least one of the pluralities of wind turbines in the wind farm, the odometer representing operational usage of the component(s). The method also includes tracking the operational usage for the component(s) using the odometer and a usage threshold. Further, the method includes predicting an expected time frame for one or more preventative maintenance actions based on a comparison of the tracked operational usage and the usage threshold. Moreover, the method includes triggering scheduling of the one or more preventative maintenance (Continued)

actions when the prediction indicates that the tracked operational usage will exceed the usage threshold. In addition, the method includes shutting down the wind turbine or idling the wind turbine once the one or more preventative maintenance actions are scheduled.

20 Claims, 9 Drawing Sheets

(51) Int. Cl.
    *G01M 13/00*     (2019.01)
    *G05B 23/02*     (2006.01)
    *G06Q 10/20*     (2023.01)

(58) Field of Classification Search
    CPC ............... F03D 17/00; F05B 2270/309; G05B 23/0283; G06Q 10/20; G01M 13/00; Y02E 10/72
    See application file for complete search history.

(56) References Cited

U.S. PATENT DOCUMENTS

| | | | |
|---|---|---|---|
| 7,149,657 B2 | 12/2006 | Goebel et al. |
| 7,256,508 B2 | 8/2007 | Altemark et al. |
| 7,395,188 B1 | 7/2008 | Goebel et al. |
| 7,548,830 B2 | 6/2009 | Goebel et al. |
| 7,725,293 B2 | 5/2010 | Bonissone et al. |
| 7,889,840 B2 | 2/2011 | Vasudevan et al. |
| 8,108,080 B2 | 1/2012 | Wakata et al. |
| 8,249,852 B2 | 8/2012 | Thulke |
| 8,451,134 B2 | 5/2013 | Bharadwaj et al. |
| 8,554,386 B2 | 10/2013 | Rutman |
| 9,074,468 B1 | 7/2015 | Selman et al. |
| 9,194,376 B2 | 11/2015 | Ritter et al. |
| 9,395,270 B2 | 7/2016 | Czerniak et al. |
| 9,797,328 B2 | 10/2017 | Martinez et al. |
| 9,816,483 B2 | 11/2017 | Nakamura et al. |
| 9,859,787 B2 | 1/2018 | Wagoner et al. |
| 9,874,107 B2 | 1/2018 | Falb et al. |
| 9,897,516 B2 | 2/2018 | Bechhoefer et al. |
| 10,288,043 B2 | 5/2019 | Yu et al. |
| 2004/0260512 A1 | 12/2004 | Olsson |
| 2005/0005186 A1 | 1/2005 | Goebel et al. |
| 2006/0228214 A1 | 10/2006 | Mabe et al. |
| 2008/0140361 A1 | 6/2008 | Bonissone et al. |
| 2011/0020122 A1 | 1/2011 | Parthasarathy et al. |
| 2012/0065901 A1 | 3/2012 | Bechhoefer et al. |
| 2012/0286509 A1 | 11/2012 | Rafoth |
| 2013/0073223 A1 | 3/2013 | Lapira et al. |
| 2014/0324495 A1 | 10/2014 | Zhou et al. |
| 2015/0381443 A1 | 12/2015 | Du Plessis |
| 2018/0173214 A1 | 6/2018 | Higgins et al. |
| 2018/0180026 A1 | 6/2018 | Spruce et al. |
| 2019/0203696 A1 | 7/2019 | Kaucic et al. |

FOREIGN PATENT DOCUMENTS

| | | |
|---|---|---|
| CN | 106097146 A | 11/2016 |
| CN | 107769254 A | 3/2018 |
| CN | 110059872 A | 7/2019 |
| EP | 2578874 A1 | 4/2013 |
| EP | 2457320 B1 | 4/2014 |
| EP | 2837984 B1 | 5/2019 |
| EP | 2956831 B1 | 8/2019 |
| WO | WO2017205221 A1 | 11/2017 |

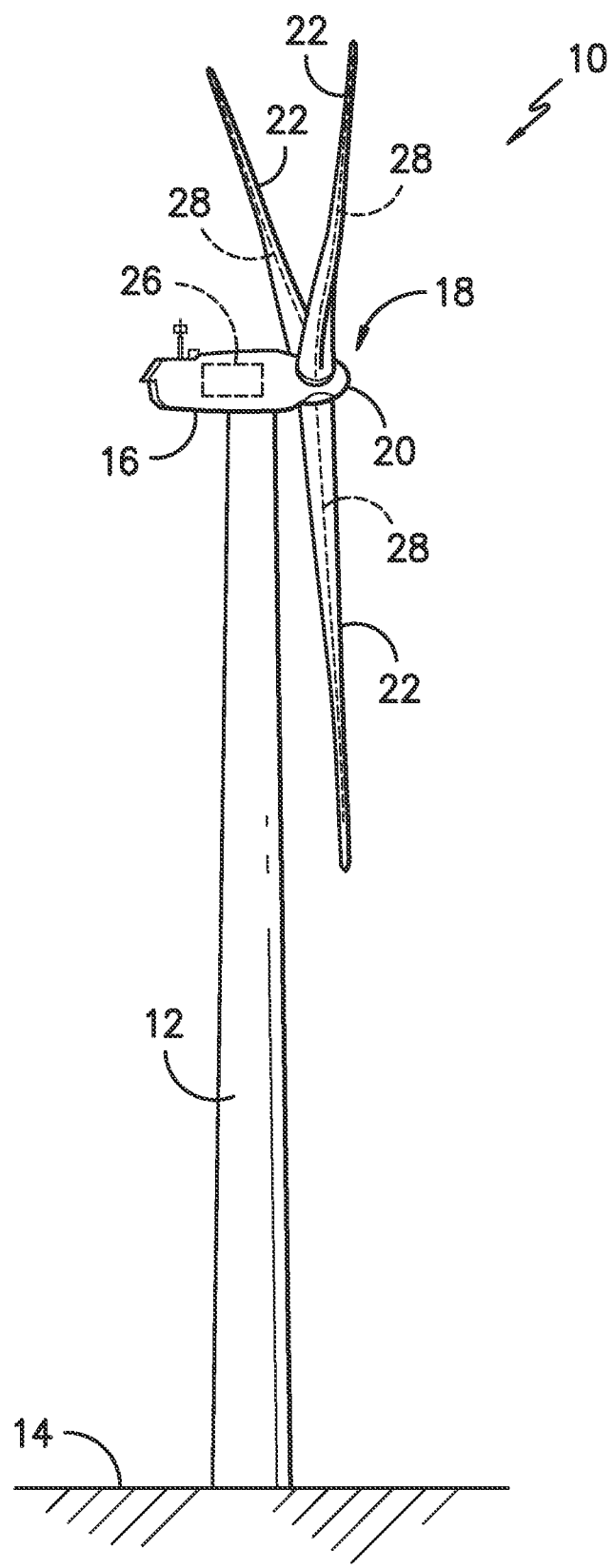
FIG. -1-

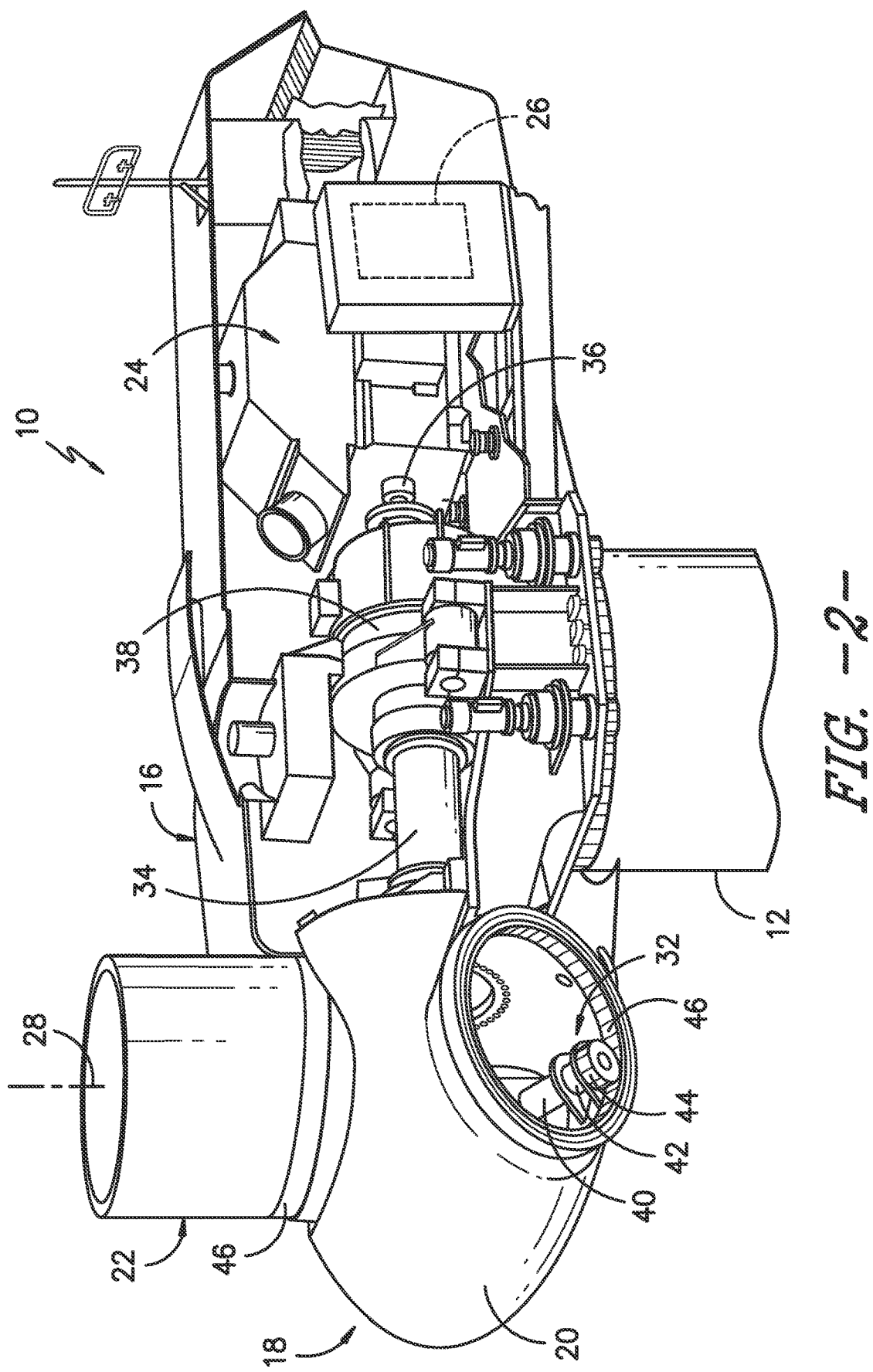
FIG. -2-

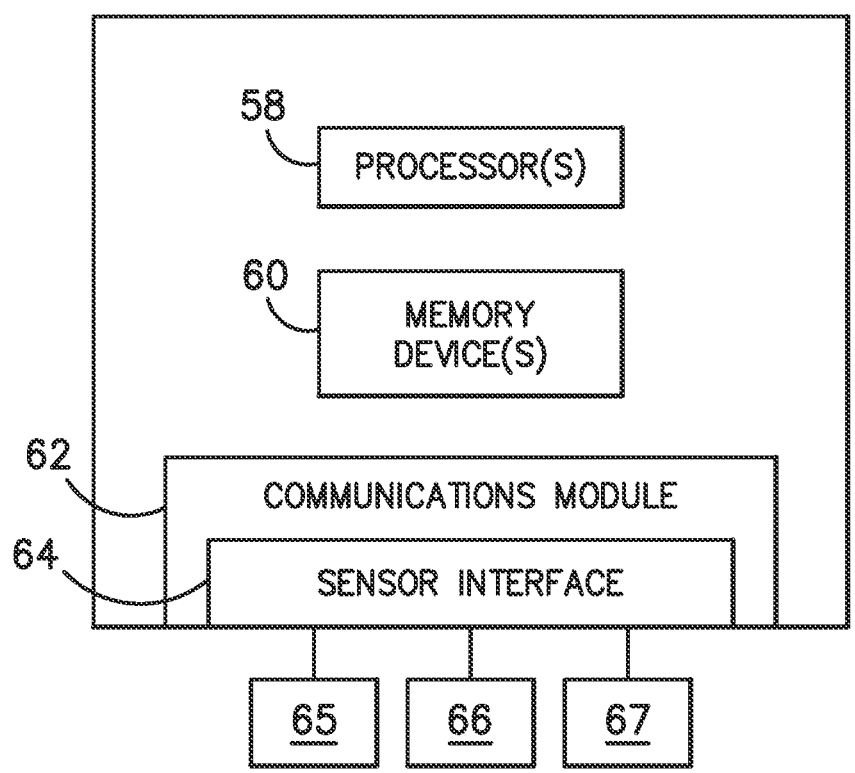
FIG. -3-

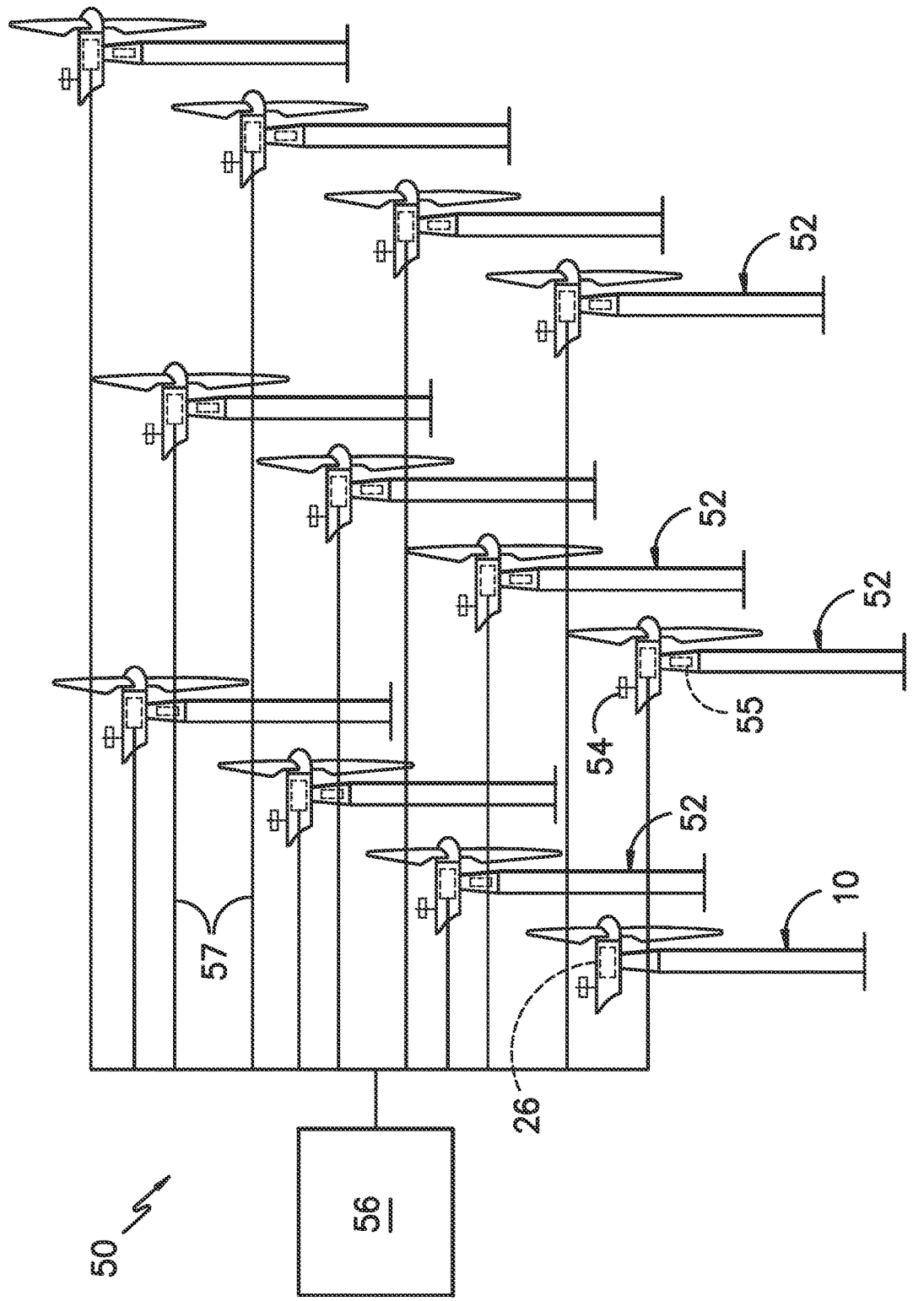

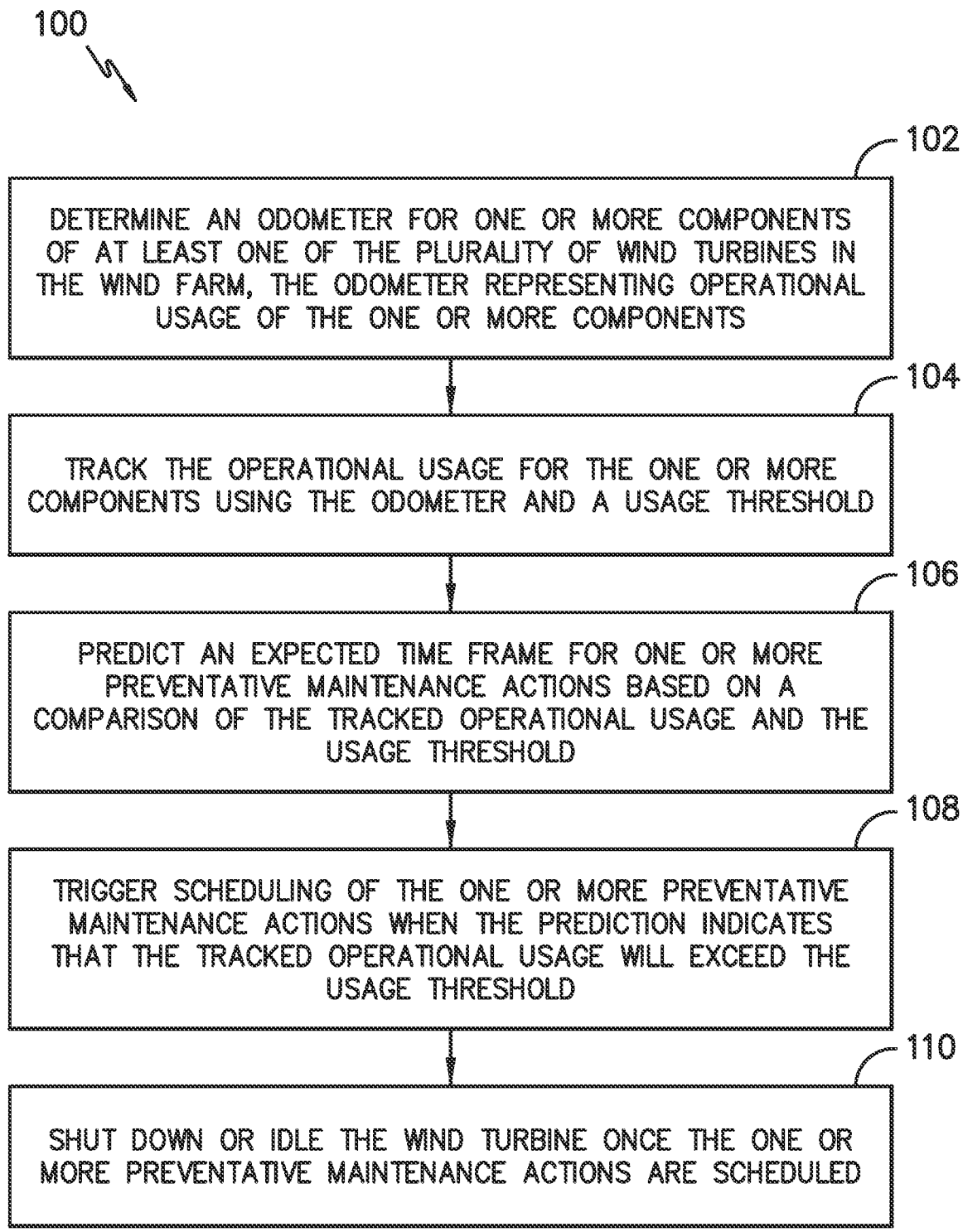
FIG. -5-

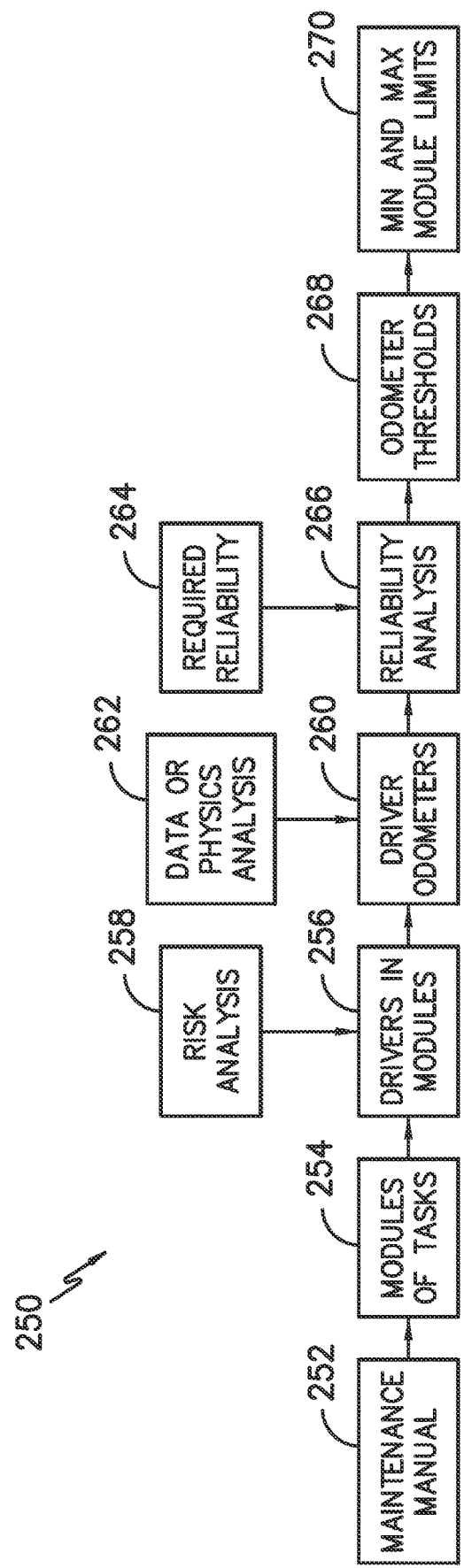
FIG. -6-

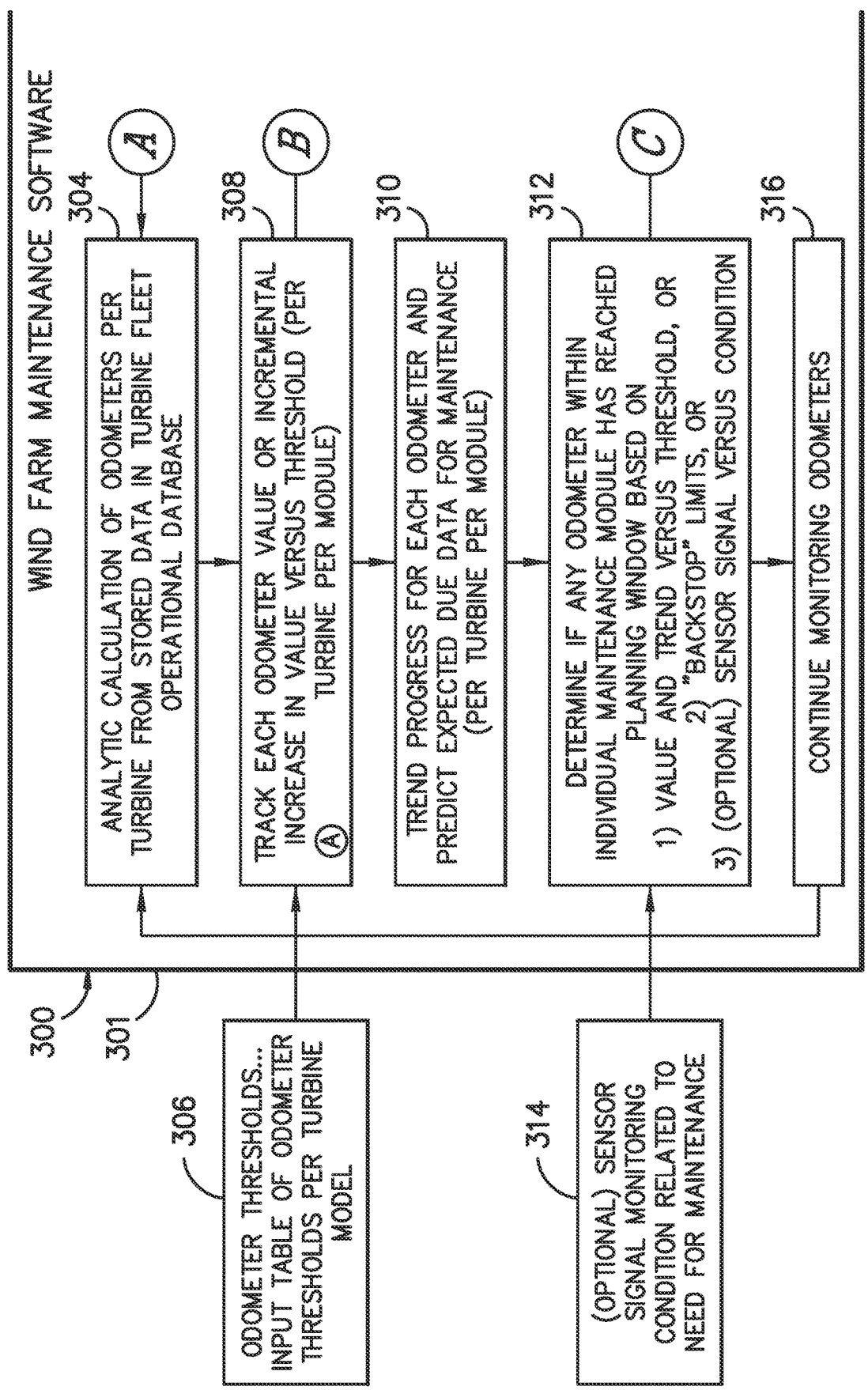
FIG. -7A-

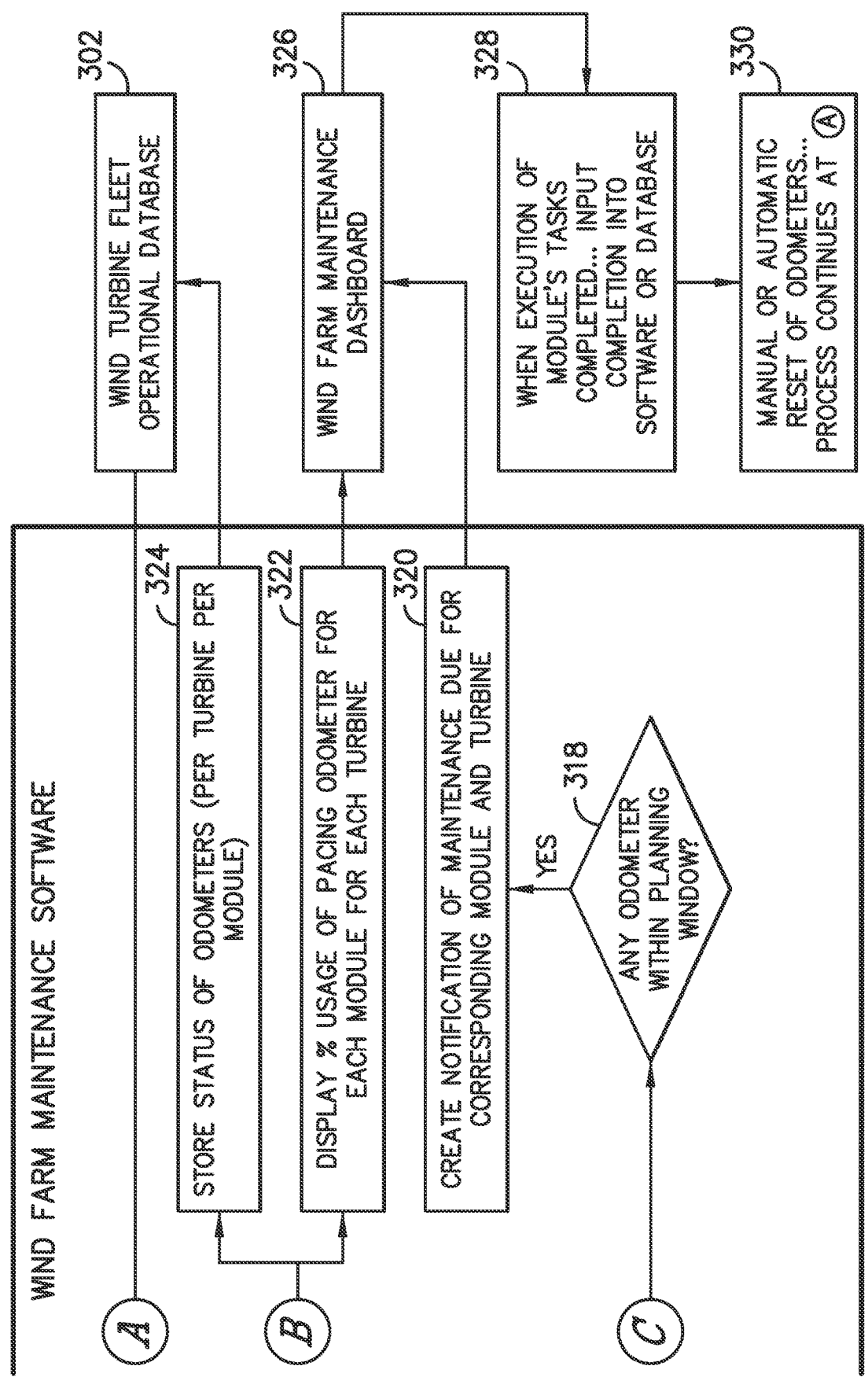
FIG. -7B-

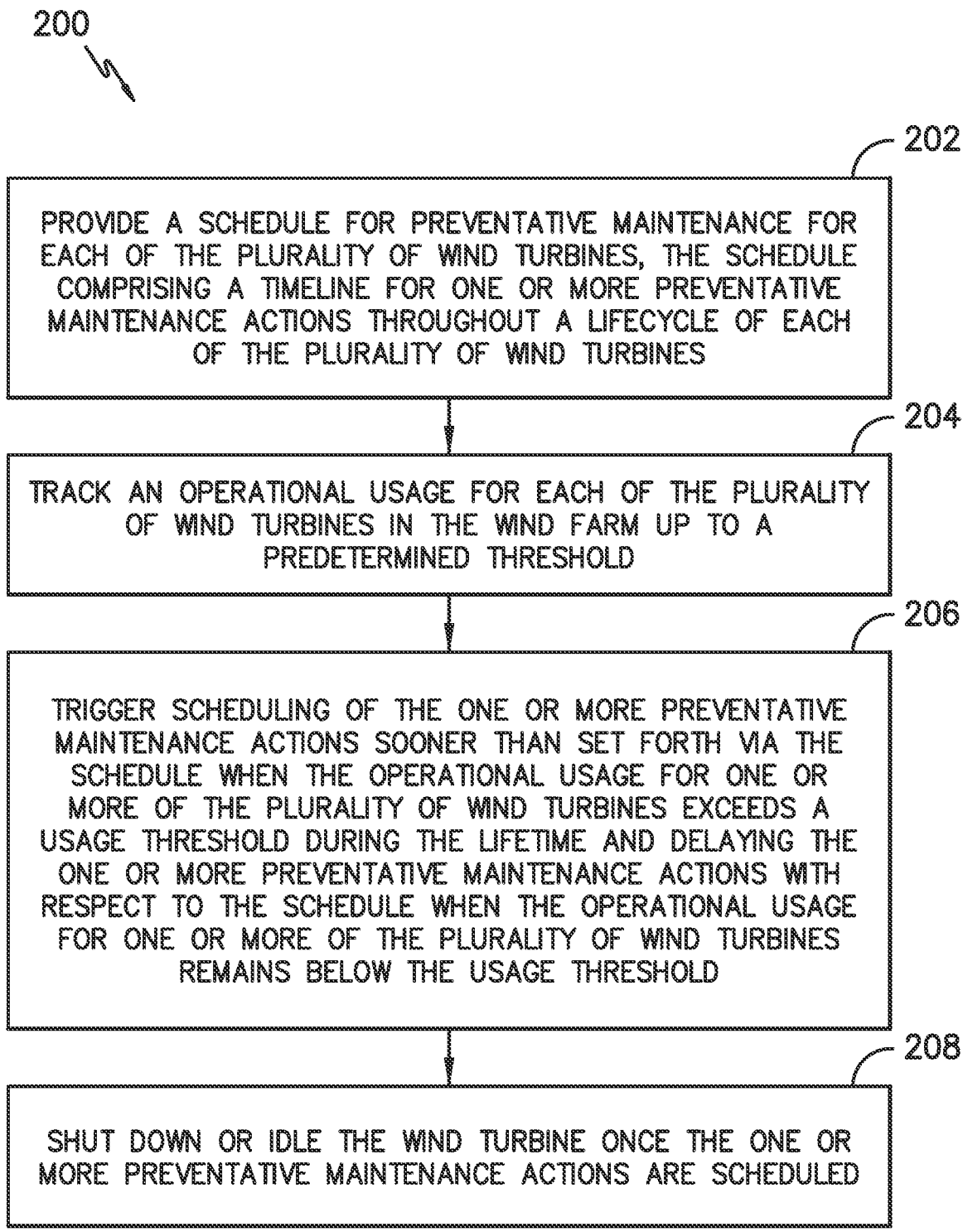
FIG. -8-

SYSTEM AND METHOD FOR SCHEDULING PREVENTATIVE MAINTENANCE ACTIONS BASED ON OPERATIONAL USAGE

FIELD

The present disclosure relates generally to wind turbines and, more particularly, to a system and method for scheduling one or more preventative maintenance actions based on operational usage and/or reliability modeling.

BACKGROUND

Wind power is considered one of the cleanest, most environmentally friendly energy sources presently available and wind turbines have gained increased attention in this regard. A modern wind turbine typically includes a tower, a generator, a gearbox, a nacelle, and one or more rotor blades. The rotor blades are the primary elements for converting wind energy into electrical energy. The blades typically have the cross-sectional profile of an airfoil such that, during operation, air flows over the blade producing a pressure difference between its sides. Consequently, a lift force, which is directed from the pressure side towards the suction side, acts on the blade. The lift force generates torque on the main rotor shaft, which is connected to a generator for producing electricity.

Typically, wind turbines are designed to operate at a rated power output over a predetermined or anticipated operating life. For instance, a typical wind turbine is designed for a 20-year life. However, in many instances, this anticipated overall operating life is limited or based on the anticipated fatigue life of one or more of the wind turbine components. The life consumption or operational usage of the wind turbine (which can include fatigue or extreme loads, wear, and/or other life parameters) as used herein generally refers to the life of the wind turbine or its components that has been consumed or exhausted by previous operation. Thus, for conventional wind turbines, various preventative maintenance actions are generally scheduled at predetermined time intervals over the life of the wind turbine to prevent accelerated life consumption that may occur if such maintenance actions were not performed.

However, the cost and associated downtime of such maintenance actions are significant drivers for the overall lifecycle cost of the wind turbine and should therefore be optimized. In addition, wind turbines with higher operational usage may be under-maintained and more at risk for unplanned poor-quality events. Similarly, wind turbines with lower operational usage may over-maintained.

Thus, an improved system and method for scheduling one or more preventative maintenance actions based on operational usage rather than time would be welcomed in the art. Accordingly, the system and method of the present disclosure allows for scheduling preventative maintenance that can be tailored to individual wind turbines based on operational usage, thereby optimizing the cost associated therewith.

BRIEF DESCRIPTION

Aspects and advantages of the invention will be set forth in part in the following description, or may be obvious from the description, or may be learned through practice of the invention.

In one aspect, the present disclosure is directed to a method for operating and maintaining a wind farm comprising a plurality of wind turbines. The method includes determining an odometer for one or more components of at least one of the plurality of wind turbines in the wind farm, the odometer representing operational usage of the one or more components. The method also includes tracking the operational usage for the one or more components using the odometer and a usage threshold. Further, the method includes predicting an expected time frame for one or more preventative maintenance actions based on a comparison of the tracked operational usage and the usage threshold. Moreover, the method includes triggering scheduling of the one or more preventative maintenance actions when the prediction indicates that the tracked operational usage will exceed the usage threshold. In addition, the method includes shutting down the wind turbine or idling the wind turbine once the one or more preventative maintenance actions are scheduled.

In an embodiment, determining the odometer for the component(s) of the plurality of wind turbines in the wind farm may include calculating the odometer for the component(s) using at least one of physics analysis, one or more transfer functions, operational data, turbine configuration specifics, materials (such as lubrication type), and/or combinations thereof. In such embodiments, the operational data may include sensor data, historical wind turbine operational data, historical wind farm operational data, historical maintenance data, historical quality issues, reliability data, or combinations thereof. More specifically, in certain embodiments, the operational data may include one or more of the following operational parameters: power output, torque, pitch angle, a loading condition, generator speed, generator revolution accumulation, rotor speed, rotor revolution accumulation, wind direction, air density, turbulence intensity, wind gusts, wind shear, wind speed, wind upflow, an amount of yawing, an amount of pitching, temperature, and/or any other suitable operational parameter.

In further embodiments, calculating the odometer for the component(s) of the plurality of wind turbines in the wind farm may include, for example, receiving the operational data, normalizing the operational data, and calculating the odometer by inputting the normalized operational data into a computer-implemented model. For example, in certain embodiments, the computer-implemented model may be a damage accumulation model, such as Miner's Rule.

In another embodiment, the method may include grouping a plurality of maintenance actions together into a plurality of modules based on at least one of maintenance type, maintenance location within a respective wind turbine, required tooling for the one or more preventative maintenance actions, and/or technician skill. Thus, in such embodiments, the method may also include identifying one or more critical preventative maintenance actions within the plurality of modules based on risk.

Accordingly, in an embodiment, determining the odometer for the component(s) of the plurality of wind turbines in the wind farm may include determining a module odometer for the one or more critical preventative maintenance actions in each of the plurality of modules.

Moreover, in an embodiment, the method may further include setting a required reliability level for each of the plurality of wind turbines in the wind farm and/or the one or more components, performing a reliability analysis for each of the one or more critical preventative maintenance actions using the operational data and the required reliability level, and determining a module usage threshold for each of the module odometers using the reliability analysis, each of the module usage thresholds corresponding to a value at which the one or more critical preventative maintenance actions is triggered. In still further embodiments, the method may further include updating the reliability analysis over time using feedback from real-time operational data and/or maintenance data. In additional embodiments, the method may also include utilizing machine learning to automatically adjust the module usage threshold based on the real-time operational data and/or maintenance data.

Thus, in an embodiment, predicting the expected time frame for one or more preventative maintenance actions based on the comparison of the tracked operational usage and the usage threshold may include predicting the expected time frame for the one or more critical preventative maintenance actions based on the comparison of the tracked operational usage and module usage thresholds.

In still further embodiments, triggering scheduling of the preventative maintenance action(s) when the prediction indicates that the tracked operational usage will exceed the usage threshold may include triggering scheduling of the plurality of maintenance actions within one or more of the plurality of modules when the prediction indicates that the operational usage of the component(s) will exceed one or more of the module usage thresholds.

In yet another embodiment, the method may include delaying the triggering of the scheduling of each of the plurality of maintenance actions up to a maximum time frame for as long as the operational usage for the component(s) remains below the respective module usage thresholds and triggering scheduling of the plurality of maintenance actions when the maximum time frame is reached. Similarly, in an embodiment, the method may include setting a minimum time frame for triggering scheduling of each of the plurality of maintenance actions and if one or more of the respective module usage thresholds is reached before the minimum time frame, delaying scheduling of the plurality of maintenance actions until the minimum time frame is reached.

In additional embodiments, triggering scheduling of the plurality of maintenance actions within one or more of the plurality of modules may include, for example, triggering scheduling of a first module of the plurality of modules every other time (or a plurality of times) scheduling of a second module of the plurality of modules is triggered or triggering scheduling of the first module of the plurality of modules only when both scheduling of the second module of the plurality of modules is triggered and another condition is met.

In another aspect, the present disclosure is directed to a method for operating and maintaining a wind farm comprising a plurality of wind turbines. The method may include providing a schedule for preventative maintenance for each of the plurality of wind turbines, the schedule comprising a timeline for one or more preventative maintenance actions throughout a lifecycle of each of the plurality of wind turbines. Further, the method includes tracking an operational usage for each of the plurality of wind turbines in the wind farm up to a predetermined threshold. Moreover, the method includes triggering scheduling of the preventative maintenance action(s) sooner than set forth via the schedule when the operational usage for one or more of the plurality of wind turbines exceeds a usage threshold during the lifetime and delaying the preventative maintenance action(s) with respect to the schedule when the operational usage for one or more of the plurality of wind turbines remains below the usage threshold. In addition, the method includes shutting down the wind turbine or idling the wind turbine once the preventative maintenance action(s) is scheduled. It should be understood that the method may further include any of the steps and/or features described herein.

In yet another aspect, the present disclosure is directed to a system for operating and maintaining a wind turbine. The system includes a controller having a maintenance software package configured to implement a plurality of operations, including but not limited to, determining an odometer for one or more components of the wind turbine, the odometer representing operational usage of the one or more components, tracking the operational usage for the component(s) using the odometer and a usage threshold, predicting an expected time frame for preventative maintenance action(s) based on a comparison of the tracked operational usage and the usage threshold, triggering the preventative maintenance action(s) when the prediction indicates that the tracked operational usage will exceed the usage threshold, and shutting down the wind turbine or idling the wind turbine once the preventative maintenance action(s) is triggered. It should be understood that the system may further be configured to with any of the features described herein.

These and other features, aspects and advantages of the present invention will become better understood with reference to the following description and appended claims. The accompanying drawings, which are incorporated in and constitute a part of this specification, illustrate embodiments of the invention and, together with the description, explain the principles of the invention.

BRIEF DESCRIPTION OF THE DRAWINGS

A full and enabling disclosure of the present invention, including the best mode thereof, directed to one of ordinary skill in the art, is set forth in the specification, which refers to the appended figures, in which:

FIG. 1 illustrates a perspective view of one embodiment of a wind turbine according to the present disclosure;

FIG. 2 illustrates a simplified, internal view of one embodiment of a nacelle of a wind turbine according to the present disclosure;

FIG. 3 illustrates a schematic view of one embodiment of suitable components that may be included within a turbine controller of the wind turbine shown in FIG. 1;

FIG. 4 illustrates a wind farm having a plurality of wind turbines according to the present disclosure;

FIG. 5 illustrates a flow chart of one embodiment of a method for operating and maintaining a wind farm having a plurality of wind turbines according to the present disclosure;

FIG. 6 illustrates a flow diagram of one embodiment of a method for creating the odometer framework according to the present disclosure, particularly illustrating creation of the odometers and the odometer threshold values;

FIGS. 7A-7B illustrate a schematic diagram of one embodiment of a wind farm maintenance software package according to the present disclosure; and FIG. 8 illustrates a flow chart of another embodiment of a method for operating and maintaining a wind farm having a plurality of wind turbines according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to a flexible approach to scheduling preventative maintenance for wind turbines. Current time-based preventative maintenance scheduling is a significant driver of lifecycle cost for operating a wind turbine or wind farm. Further, the time-based scheduling fails to account for the variations in operational usage of a wind turbine/fleet. For example, wind turbines with higher operational usage are potentially under-maintained, whereas wind turbines with lower operational usage are potentially over-maintained. Thus, the present disclosure is directed to systems and methods for triggering scheduling of preventative maintenance actions by counting operational usage ("odometers") of wind turbines up to a predetermined risk level ("usage thresholds") based at least in part on historical fleet data. Such odometers can be optimized to balance risk and productivity. Additional minimum and maximum times frames may additional be set to minimize risk. In addition, the preventative maintenance actions can be grouped into modules with distinct odometers for flexibility to further optimize productivity.

The present disclosure provides many advantages not present in the prior art. For example, the present disclosure can utilize readily-available/already-existing operational data and is not necessarily required to collect new or additional data (although new or additional sensors may be utilized if desired). Further, the present disclosure can be applied to any wind turbine, regardless of model, design, size, or manufacturer. In still further instances, the operational-usage-based scheduling described herein may be combined with traditional condition-based maintenance (in which sensor data may be trended overtime to monitor for changes in the data).

Referring now to the drawings, FIG. 1 illustrates a perspective view of one embodiment of a wind turbine 10 configured to implement the control technology according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or to implement a corrective action.

As such, the controller 26 may include a computer or other suitable processing unit. Thus, in several embodiments, the controller 26 may include suitable computer-readable instructions that, when implemented, configure the controller 26 to perform various functions, such as receiving, transmitting and/or executing wind turbine control signals.

Accordingly, the controller 26 may generally be configured to control the various operating modes of the wind turbine 10 (e.g., start-up or shut-down sequences), de-rate the wind turbine 10, and/or control various components of the wind turbine 10. For example, the controller 26 may be configured to control the blade pitch or pitch angle of each of the rotor blades 22 (i.e., an angle that determines a perspective of the rotor blades 22 with respect to the direction of the wind) to control the power output generated by the wind turbine 10 by adjusting an angular position of at least one rotor blade 22 relative to the wind. For instance, the controller 26 may control the pitch angle of the rotor blades 22 by rotating the rotor blades 22 about a pitch axis 28, either individually or simultaneously, by transmitting suitable control signals to a pitch drive or pitch adjustment mechanism (not shown) of the wind turbine 10.

Referring now to FIG. 2, a simplified, internal view of one embodiment of the nacelle 16 of the wind turbine 10 shown in FIG. 1 is illustrated. As shown, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 66 communicatively coupled to the controller 26, with each yaw drive mechanism(s) 66 being configured to change the angle of the nacelle 16 relative to the wind (e.g., by engaging a yaw bearing 68 of the wind turbine 10).

Referring now to FIG. 3, there is illustrated a block diagram of one embodiment of suitable components that may be included within a controller in accordance with aspects of the present disclosure. It should be understood that the various components of the controller of FIG. 3 may be applicable to any suitable controller, including for example, the controller 300 (which is described in more detail below with respect to FIGS. 7A, and 7B), the turbine controller 26, and/or the farm-level controller 56 described herein.

As shown, the controller may include one or more processor(s) 58 and associated memory device(s) 60 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Additionally, the controller may also include a communications module 62 to facilitate communications between the controller and the various components of the wind turbine 10. For instance, the communications module 62 may include a sensor interface 64 (e.g., one or more analog-to-digital converters) to permit the signals transmitted by one or more sensors 65, 66, 67 to be converted into signals that can be understood and processed by the controller. It should be appreciated that the sensors 65, 66, 67 may be communicatively coupled to the communications module 62 using any suitable means. For example, as shown in FIG. 3, the sensors 65, 66, 67 are coupled to the sensor interface 64 via a wired connection. However, in other embodiments, the sensors 65, 66, 67 may be coupled to the sensor interface 64 via a wireless connection, such as by using any suitable wireless communications protocol known in the art. As such, the processor 58 may be configured to receive one or more signals from the sensors 65, 66, 67.

The sensors 65, 66, 67 of the wind turbine 10 may be any suitable sensors configured to measure any operational condition and/or wind parameter at or near the wind turbine. For example, the sensors 65, 66, 67 may include blade sensors for measuring a pitch angle of one of the rotor blades 22 or for measuring a loading acting on one of the rotor blades 22; generator sensors for monitoring the generator (e.g. torque, rotational speed, acceleration and/or the power output); and/or various wind sensors for measuring various wind parameters. In addition, the sensors 65, 66, 67 may be located near the ground of the wind turbine, on the nacelle, or on a meteorological mast of the wind turbine.

It should also be understood that any other number or type of sensors may be employed and at any location. For example, the sensors may be analog sensors, digital sensors, optical/visual sensors, accelerometers, pressure sensors, angle of attack sensors, vibration sensors, MIMU sensors, fiber optic systems, temperature sensors, wind sensors, Sonic Detection and Ranging (SODAR) sensors, infra lasers, Light Detecting and Ranging (LIDAR) sensors, radiometers, pitot tubes, rawinsondes, and/or any other suitable sensors. It should be appreciated that, as used herein, the term "monitor" and variations thereof indicate that the various sensors of the wind turbine may be configured to provide a direct measurement of the parameters being monitored or an indirect measurement of such parameters. Thus, the sensors 65, 66, 67 may, for example, be used to generate signals relating to the parameter being monitored, which can then be utilized by the controller to determine the actual condition.

As mentioned, the processor(s) 58 is configured to perform any of the steps of the methods according to the present disclosure. For example, the processor 58 may be configured to determine the operational usage for the wind turbine 10. As used herein, "operational usage" generally refers to the number of operating seconds, minutes, hours, or similar that the wind turbine 10 and or its various components has operated at various operational parameters and/or under certain conditions. Such operational parameters that may be considered or tracked may include, for example, one or more of the following: power output, torque, pitch angle, a loading condition, generator speed, rotor speed, wind direction, air density, turbulence intensity, wind gusts, wind shear, wind speed, wind upflow, an amount of yawing, an amount of pitching, or temperature. Moreover, the operational data may include sensor data, historical wind turbine operational data, historical wind farm operational data, historical maintenance data, historical quality issues, or combinations thereof. Thus, the processor 58 may also be configured to record and store the operational usage in the memory store 60 for later use. For example, the processor 58 may store the operational usage in one or more look-up tables (LUTs). Moreover, the operational usage may be stored in the cloud.

The loading conditions(s) described herein may be reflective of any of the following: a wind turbine thrust, a blade loading, a tower loading, a shaft loading, a nacelle loading, a hub loading, a pitch- or yaw-bearing loading, and/or any other suitable loading acting on the wind turbine. In addition, the loading condition may be reflective of a fatigue loading or an extreme loading acting on the wind turbine 10 and/or its various components. Fatigue loads are typically caused by the cyclic movement of the wind turbine and/or constant loads that cause damage over time, whereas extreme loads are typically caused by storm loads and/or extreme turbulence intensity levels that occur in short intervals.

Referring now to FIG. 4, the system and method as described herein may also be combined with a wind farm controller 56 of a wind farm 50. As shown, the wind farm 50 may include a plurality of wind turbines 52, including the wind turbine 10 described above. For example, as shown in the illustrated embodiment, the wind farm 50 includes twelve wind turbines, including wind turbine 10. However, in other embodiments, the wind farm 50 may include any other number of wind turbines, such as less than twelve wind turbines or greater than twelve wind turbines. In one embodiment, the controller 26 of wind turbine 10 may be communicatively coupled to the farm controller 56 through a wired connection, such as by connecting the controller 26 through suitable communicative links 57 (e.g., a suitable cable). Alternatively, the controller 26 may be communicatively coupled to the farm controller 56 through a wireless connection, such as by using any suitable wireless communications protocol known in the art.

In several embodiments, one or more of the wind turbines 52 in the wind farm 50 may include a plurality of sensors for monitoring various operating parameters/conditions of the wind turbines 52. For example, as shown, one of the wind turbines 52 includes a wind sensor 54, such as an anemometer or any other suitable device, configured for measuring wind speeds. As is generally understood, wind speeds may vary significantly across a wind farm 50. Thus, the wind sensor(s) 54 may allow for the local wind speed at each wind turbine 52 to be monitored. In addition, the wind turbine 52 may also include an additional sensor 55. For instance, the sensors 55 may be configured to monitor electrical properties of the output of the generator of each wind turbine 52, such as current sensors, voltage sensors, temperature sensors, or power monitors that monitor power output directly based on current and voltage measurements. Alternatively, the sensors 55 may comprise any other sensors that may be utilized to monitor the power output of a wind turbine 52. It should also be understood that the wind turbines 52 in the wind farm 50 may include any other suitable sensor known in the art for measuring and/or monitoring wind conditions and/or wind turbine conditions.

Referring now to FIG. 5, a flow diagram of one embodiment of a method 100 for operating and maintaining a wind farm having a plurality of wind turbines is illustrated in accordance with aspects of the present disclosure. The method 100 is described herein as implemented using, for example, the wind turbines 52 of the wind farm 50 described above. However, it should be appreciated that the disclosed method 100 may be implemented using any other suitable wind turbine now known or later developed in the art. In addition, although FIG. 5 depicts steps performed in a particular order for purposes of illustration and discussion, the methods described herein are not limited to any order or arrangement. One skilled in the art, using the disclosures provided herein, will appreciate that various steps of the methods can be omitted, rearranged, combined and/or adapted in various ways.

As shown at (102), the method 100 includes determining an odometer for one or more components of at least one of the wind turbines 52 in the wind farm 50. In such instances, the odometer(s) described herein represent the operational usage of the component(s), such as any of the wind turbine components described herein. Furthermore, in an embodiment, a controller 300 (FIGS. 7A and 7B) may determine the odometer for the component(s) by calculating the odometer using at least one of physics analysis, a transfer function, operational data, or combinations thereof.

More specifically, in particular embodiments, the controller 300 may calculate the odometer for the component(s) by receiving various operational data, normalizing the operational data, and calculating the odometer by inputting the normalized operational data into a computer-implemented model having loading analysis software. For example, in certain embodiments, the computer-implemented model may include a damage accumulation model, e.g. such as Miner's Rule. In doing so, the various operational parameters for the wind turbine 10 and its components may be input into the model. Thereafter, using Miner's Rule, the odometer of one or more of the wind turbines 52 may be modeled based on the turbine's known and/or expected operating conditions.

Referring still to FIG. 5, as shown at (104), the method 100 includes tracking the operational usage for the component(s) using the odometer and a usage threshold. As shown at (106), the method 100 includes predicting an expected time frame for one or more preventative maintenance actions based on a comparison of the tracked operational usage and the usage threshold. As shown at (108), the method 100 includes triggering scheduling of the one or more preventative maintenance actions when the prediction indicates that the tracked operational usage will exceed the usage threshold. As shown at (110), the method 100 includes shutting down the wind turbine 10 or idling the wind turbine 10 once the one or more preventative maintenance actions are scheduled such that the maintenance actions can be safely performed.

Referring now to FIG. 6, a particular flow diagram 250 of one embodiment of a method for creating the odometer framework according to the present disclosure, particularly illustrating creation of the odometers and the odometer threshold values according to the present disclosure is illustrated. As shown at 252, wind turbines are generally provided with a maintenance manual that includes a plurality of preventative maintenance actions that need to be completed throughout the lifecycle of the turbine. Oftentimes, such manuals may include hundreds of preventative maintenance actions, such as when to add or replace lubricant associated with the various bearings in the wind turbine, when to tighten one or more joints or bolt connections, when to clean various components, and/or when to replace one or more filters.

As shown at 254, the preventative maintenance actions of one of the wind turbines 52 may be grouped into a plurality of modules based on, for example, maintenance type, maintenance location within a respective wind turbine, required tooling for the one or more preventative maintenance actions, and/or technician skill. Thus, in such embodiments, as shown at 256, one or more critical preventative maintenance actions or drivers may be identified within the plurality of modules, e.g. based on a risk analysis 258. As described herein, the driver maintenance actions generally refer to those actions that would need maintenance earlier than other actions in a particular module. As shown at 260, the controller 300 may determine a module odometer for the critical preventative maintenance action(s) in each of the modules. More specifically, as shown at 262, the driver or module odometers may be determined using a physics analysis and the operational data as described previously with reference to FIG. 5.

Moreover, as shown at 264, the controller 300 may set a required reliability level for each of the wind turbines 52 in the wind farm 50 and/or the components. Thus, as shown at 266, the method may include performing a reliability analysis for each of the critical preventative maintenance action(s) using the operational data and the required reliability level. Accordingly, as shown at 268, the method may further include determining a module usage threshold for each of the module odometers using the reliability analysis. In such embodiments, each of the module usage thresholds corresponds to a value at which one or more of the critical preventative maintenance actions is triggered.

Thus, in an embodiment, the controller 300 may predict the expected time frame for the critical preventative maintenance action(s) based on the comparison of the tracked operational usage and module usage thresholds. Moreover, the controller may trigger scheduling of the plurality of maintenance actions within one or more of the plurality of modules when the prediction indicates that the operational usage of the component(s) will exceed one or more of the module usage thresholds.

In certain embodiments, as shown at 270, the controller 300 may delay triggering of the scheduling of each of the plurality of maintenance actions up to a maximum time frame for as long as the operational usage for the component(s) remains below the respective module usage thresholds. Similarly, in an embodiment, the controller may set a minimum time frame for triggering scheduling of each of the plurality of maintenance actions.

In certain embodiments, the controller may, for example, trigger scheduling of a first module of the plurality of modules every other time (or a plurality of times) scheduling of a second module of the plurality of modules is triggered or triggering scheduling of the first module of the plurality of modules only when both scheduling of the second module of the plurality of modules is triggered and another condition is met.

Referring now to FIGS. 7A-7B, a schematic diagram of one embodiment of a controller 300 configured to implement a wind farm maintenance software package or application 301 according to the present disclosure is illustrated. As shown at 302 in FIG. 7B, a database of operational data may be used by the maintenance software package 301 of the controller 300. Thus, the database may be local to an individual wind turbine 52, local to the wind farm 50, or at any suitable remote location. Moreover, the frequency of the data pull may be continuous, set at certain intervals, or may vary.

Moving from FIG. 7B and following path A to FIG. 7A, as shown at 304, the controller 300 may perform an analytic calculation of the odometers per wind turbine from the stored data in the wind farm 50. Further, as shown at 306 and 308, the controller 300 may track each odometer value or incremental increase in value versus the usage threshold (e.g. per wind turbine per module), i.e. using the odometer thresholds as an input table. In certain embodiments, the usage threshold values as well as the maximum and minimum time frame limits described herein may be manually or remotely input into the software and updated at any time.

As shown at 310, the controller 300 may then trend progress for each odometer and predict an expected due date for the preventative maintenance actions described herein (e.g. per wind turbine per module). As shown at 312 and 314, the controller 300 can then determine if any odometer within an individual maintenance module has reached a planning window based on the value and trend versus the usage threshold, the maximum or minimum limits, or sensor signals versus a predetermined condition.

Following path C from block 312 in FIG. 7A to path C of FIG. 7B, as shown at 318 and 320, if one of the odometers is within the planning window (meaning preventative maintenance actions should be scheduled), the controller 300 continues the method by creating a notification of a maintenance action being due for a corresponding module and wind turbine 52. Otherwise, as shown at 316 of FIG. 7A, the controller 300 simply continues monitoring the odometers.

Continuing at blocks 322 and 326 of FIG. 7B, the controller 300 may also display a usage of the odometer for each module of each wind turbine 52 in the wind farm 50, e.g. via a user interface or one or more wind farm maintenance dashboards 326. Such usage, for example, may be displayed as a percent (%) usage, a month look ahead, an expected future date, or any other suitable display. Thus, as shown at 324 in FIG. 7B, the controller 300 may also store the status of each odometer (e.g. per wind turbine per module) in the operational database at 302 (FIG. 7A). When execution of the module's preventative maintenance actions is performed, as shown at 328 in FIG. 7B, the controller 300 may further receive a completion signal, e.g. via technician input, automatically, or otherwise to indicate that such preventative maintenance action was completed. Referring still to FIG. 7B, as shown at 330, the corresponding odometers may be manually or automatically reset and the process can continue, for example, at 316 (FIG. 7A).

Referring now to FIG. 8, a flow chart of another embodiment of a method 200 for operating and maintaining a wind farm having a plurality of wind turbines according to the present disclosure is illustrated. The method 200 is described herein as implemented using, for example, the wind turbines 52 of the wind farm 50 described above. However, it should be appreciated that the disclosed method 200 may be implemented using any other suitable wind turbine now known or later developed in the art. In addition, although FIG. 8 depicts steps performed in a particular order for purposes of illustration and discussion, the methods described herein are not limited to any order or arrangement. One skilled in the art, using the disclosures provided herein, will appreciate that various steps of the methods can be omitted, rearranged, combined and/or adapted in various ways.

As shown at (202), the method 200 includes providing a schedule for preventative maintenance for each of the plurality of wind turbines. In such an embodiment, the contains a timeline for one or more preventative maintenance actions throughout a lifecycle of each of the plurality of wind turbines. As shown at (204), the method 200 includes tracking an operational usage for each of the plurality of wind turbines in the wind farm up to a predetermined threshold. As shown at (206), the method 200 includes triggering scheduling of the preventative maintenance action(s) sooner than set forth via the schedule when the operational usage for one or more of the plurality of wind turbines exceeds a usage threshold during the lifetime and delaying the preventative maintenance action(s) with respect to the schedule when the operational usage for one or more of the plurality of wind turbines remains below the usage threshold. As shown at (208), the method 200 includes shutting down the wind turbine or idling the wind turbine once the preventative maintenance action(s) is scheduled.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating and maintaining a wind farm comprising a plurality of wind turbines, the method comprising:

determining an odometer for one or more components of at least one of the plurality of wind turbines in the wind farm, the odometer representing operational usage of the one or more components;

tracking the operational usage for the one or more components using the odometer and a usage threshold;

predicting an expected time frame for one or more preventative maintenance actions based on a comparison of the tracked operational usage and the usage threshold;

triggering scheduling of the one or more preventative maintenance actions when the prediction indicates that the tracked operational usage will exceed the usage threshold; and, shutting down the wind turbine or idling the wind turbine once the one or more preventative maintenance actions are scheduled.

2. The method of claim 1, wherein determining the odometer for one or more components of the plurality of wind turbines in the wind farm further comprises:

calculating the odometer for one or more components of the plurality of wind turbines in the wind farm using at least one of physics analysis, a transfer function, operational data, turbine configuration specifics, materials, or combinations thereof, the operational data comprising sensor data, historical wind turbine operational data, historical wind farm operational data, historical maintenance data, historical quality issues, or combinations thereof.

3. The method of claim 2, wherein the operational data comprises one or more of the following operational parameters: power output, torque, pitch angle, a loading condition, generator speed, generator revolution accumulation, rotor speed, rotor revolution accumulation, wind direction, air density, turbulence intensity, wind gusts, wind shear, wind speed, wind upflow, an amount of yawing, an amount of pitching, or temperature.

4. The method of claim 2, wherein calculating the odometer for one or more components of the plurality of wind turbines in the wind farm further comprises:
   receiving the operational data;
   normalizing the operational data; and,
   calculating the odometer by inputting the normalized operational data into a computer-implemented model.

5. The method of claim 4, wherein the computer-implemented model comprises a damage accumulation model.

6. The method of claim 2, further comprising:
   grouping a plurality of preventative maintenance actions together into a plurality of modules based on at least one of maintenance type, maintenance location within a respective wind turbine, required tooling for the one or more preventative maintenance actions, or technician skill; and,
   identifying one or more critical preventative maintenance actions within the plurality of modules based on risk.

7. The method of claim 6, wherein determining the odometer for one or more components of the plurality of wind turbines in the wind farm further comprises:
   determining a module odometer for the one or more critical preventative maintenance actions in each of the plurality of modules.

8. The method of claim 7, further comprising:
   setting a required reliability level for each of the plurality of wind turbines in the wind farm and/or the one or more components; and,
   performing a reliability analysis for each of the one or more critical preventative maintenance actions using the operational data and the required reliability level; and,
   determining a module usage threshold for each of the module odometers using the reliability analysis, each of the module usage thresholds corresponding to a value at which the one or more critical preventative maintenance actions is triggered.

9. The method of claim 8, further comprising updating the reliability analysis over time using feedback from real-time operational data and/or maintenance data.

10. The method of claim 8, further comprising utilizing machine learning to automatically adjust the module usage thresholds based on the real-time operational data and/or maintenance data.

11. The method of claim 8, wherein predicting the expected time frame for one or more preventative maintenance actions based on the comparison of the tracked operational usage and the usage threshold further comprises:
   predicting the expected time frame for the one or more critical preventative maintenance actions based on the comparison of the tracked operational usage and module usage thresholds.

12. The method of claim 11, wherein triggering scheduling of the one or more preventative maintenance actions when the prediction indicates that the tracked operational usage will exceed the usage threshold further comprises:
   triggering scheduling of the plurality of maintenance actions within one or more of the plurality of modules when the prediction indicates that the operational usage of the one or more components will exceed one or more of the module usage thresholds.

13. The method of claim 12, further comprising:
   delaying the triggering of the scheduling of each of the plurality of maintenance actions up to a maximum time frame for as long as the operational usage for the one or more components remains below the respective module usage thresholds; and,
   triggering scheduling of the plurality of maintenance actions when the maximum time frame is reached.

14. The method of claim 12, further comprising:
   setting a minimum time frame for triggering scheduling of each of the plurality of maintenance actions; and,
   if one or more of the respective module usage thresholds is reached before the minimum time frame, delaying scheduling of the plurality of maintenance actions until the minimum time frame is reached.

15. The method of claim 12, wherein the triggering scheduling of the plurality of maintenance actions within one or more of the plurality of modules further comprises at least one of:
   triggering scheduling of a first module of the plurality of modules every other time or a plurality of times scheduling of a second module of the plurality of modules is triggered; or
   triggering scheduling of the first module of the plurality of modules only when both scheduling of the second module of the plurality of modules is triggered and another condition is met.

16. A method for operating and maintaining a wind farm comprising a plurality of wind turbines, the method comprising:
   providing a schedule for preventative maintenance for each of the plurality of wind turbines, the schedule comprising a timeline for one or more preventative maintenance actions throughout a lifecycle of each of the plurality of wind turbines;
   tracking an operational usage for each of the plurality of wind turbines in the wind farm up to a predetermined threshold;
   triggering scheduling of the one or more preventative maintenance actions sooner than set forth via the schedule when the operational usage for one or more of the plurality of wind turbines exceeds a usage threshold during the lifetime and delaying the one or more preventative maintenance actions with respect to the schedule when the operational usage for one or more of the plurality of wind turbines remains below the usage threshold; and,
   shutting down the wind turbine or idling the wind turbine once the one or more preventative maintenance actions are scheduled.

17. A system for operating and maintaining a wind turbine, the system comprising:
   a controller comprising a maintenance software package, the maintenance software package configured to implement a plurality of operations, the plurality of operations comprising:
      determining an odometer for one or more components of the wind turbine, the odometer representing operational usage of the one or more components;

tracking the operational usage for the one or more components using the odometer and a usage threshold;
predicting an expected time frame for one or more preventative maintenance actions based on a comparison of the tracked operational usage and the usage threshold;
triggering the one or more preventative maintenance actions when the prediction indicates that the tracked operational usage will exceed the usage threshold; and,
shutting down the wind turbine or idling the wind turbine once the one or more preventative maintenance actions are triggered.

18. The system of claim 17, wherein determining the odometer for one or more components of the wind turbine further comprises:
calculating the odometer for one or more components of the wind turbine using at least one of physics analysis, a transfer function, operational data, or combinations thereof, the operational data comprising sensor data, historical wind turbine operational data, historical wind farm operational data, historical maintenance data, historical quality issues, or combinations thereof, the operational data further comprising one or more of the following operational parameters: power output, torque, pitch angle, a loading condition, generator speed, rotor speed, wind direction, air density, turbulence intensity, wind gusts, wind shear, wind speed, wind upflow, an amount of yawing, an amount of pitching, or temperature.

19. The system of claim 18, wherein the plurality of operations further comprises:
grouping a plurality of maintenance actions together into a plurality of modules based on at least one of maintenance type, maintenance location within the wind turbine, required tooling for the one or more preventative maintenance actions, or technician skill;
identifying one or more critical preventative maintenance actions within the plurality of modules based on risk; and,
determining a module odometer for the one or more critical preventative maintenance actions in each of the plurality of modules.

20. The system of claim 19, further comprising:
setting a required reliability level for the one or more components of the wind turbine; and,
performing a reliability analysis for each of the one or more critical preventative maintenance actions using the operational data and the required reliability level;
determining a module usage threshold for each of the module odometers using the reliability analysis, each of the module usage thresholds corresponding to a value at which the one or more critical preventative maintenance actions is triggered;
predicting the expected time frame for the one or more critical preventative maintenance actions based on the comparison of the tracked operational usage and module usage thresholds; and,
triggering scheduling of the plurality of maintenance actions within one or more of the plurality of modules when the prediction indicates that the operational usage of the one or more components will exceed one or more of the module usage thresholds.

* * * * *